United States Patent
Rozen et al.

(10) Patent No.: US 8,006,113 B2
(45) Date of Patent: Aug. 23, 2011

(54) SYSTEM AND METHOD FOR CONTROLLING VOLTAGE LEVEL AND CLOCK FREQUENCY SUPPLIED TO A SYSTEM

(75) Inventors: Anton Rozen, Gedera (IL); Arik Gubeskys, Hod Hasharon (IL); Michael Priel, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 523 days.

(21) Appl. No.: 12/091,691

(22) PCT Filed: Oct. 27, 2005

(86) PCT No.: PCT/IB2005/053518
§ 371 (c)(1),
(2), (4) Date: Aug. 11, 2008

(87) PCT Pub. No.: WO2007/049100
PCT Pub. Date: May 3, 2007

(65) Prior Publication Data
US 2009/0100276 A1    Apr. 16, 2009

(51) Int. Cl.
*G06F 1/00* (2006.01)
(52) U.S. Cl. ........................................ 713/340
(58) Field of Classification Search .................. 713/300, 713/310, 320–322, 324
See application file for complete search history.

(56) References Cited

U.S. PATENT DOCUMENTS

| | | | |
|---|---|---|---|
| 5,712,826 A | 1/1998 | Wong et al. | |
| 6,079,025 A | 6/2000 | Fung | |
| 6,115,823 A | 9/2000 | Velasco et al. | |
| 6,282,661 B1 | 8/2001 | Nicol | |
| 6,584,571 B1 | 6/2003 | Fung | |
| 6,807,227 B2 | 10/2004 | Chien | |
| 6,901,521 B2 | 5/2005 | Chauvel et al. | |
| 7,313,333 B2 * | 12/2007 | Lee et al. | 398/209 |
| 7,447,919 B2 * | 11/2008 | Liepe et al. | 713/300 |
| 2002/0042887 A1 | 4/2002 | Chauvel et al. | |
| 2003/0061526 A1 | 3/2003 | Hashimoto | |
| 2004/0153679 A1 * | 8/2004 | Fitton et al. | 713/322 |
| 2004/0225901 A1 | 11/2004 | Bear et al. | |
| 2004/0225902 A1 | 11/2004 | Cesare et al. | |
| 2008/0016381 A1 * | 1/2008 | Fitton et al. | 713/320 |
| 2009/0144572 A1 * | 6/2009 | Rozen et al. | 713/322 |

FOREIGN PATENT DOCUMENTS

EP    1422596 A2    5/2004

OTHER PUBLICATIONS

Gilbert et al; "Low power implementation of a turbo-decoder on programmable architectures"; IEEE Design Automation Conference, 2001.

Li et al; "Dynamic voltage scaling with links for power optimization of interconnection networks"; IEEE 9th International Symposium of High-Performance Computer Architecture, 2003.

* cited by examiner

*Primary Examiner* — Raymond N Phan

(57) ABSTRACT

A system that includes at least one component adapted to execute at least one application, characterized by including a controller adapted to receive at least one load indication of at least one component of the system and to selectively alter at least one control parameter of a voltage and clock frequency management scheme; whereas the system is adapted to apply the voltage and clock frequency management scheme. A method for controlling voltage level and clock frequency supplied to a system, the method includes receiving at least one load indication of at least one component of the system; characterized repeating the stages of: selectively altering at least one control parameter of a voltage and clock frequency management scheme; and applying the voltage and clock frequency management scheme.

20 Claims, 6 Drawing Sheets

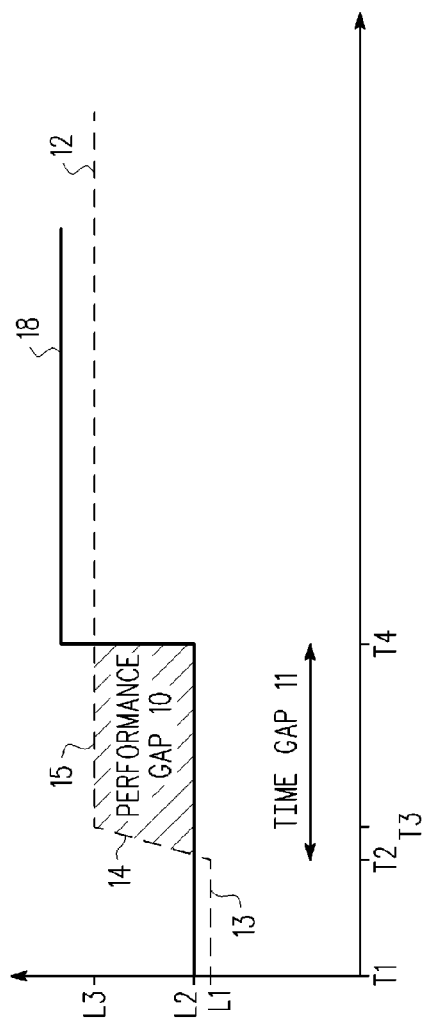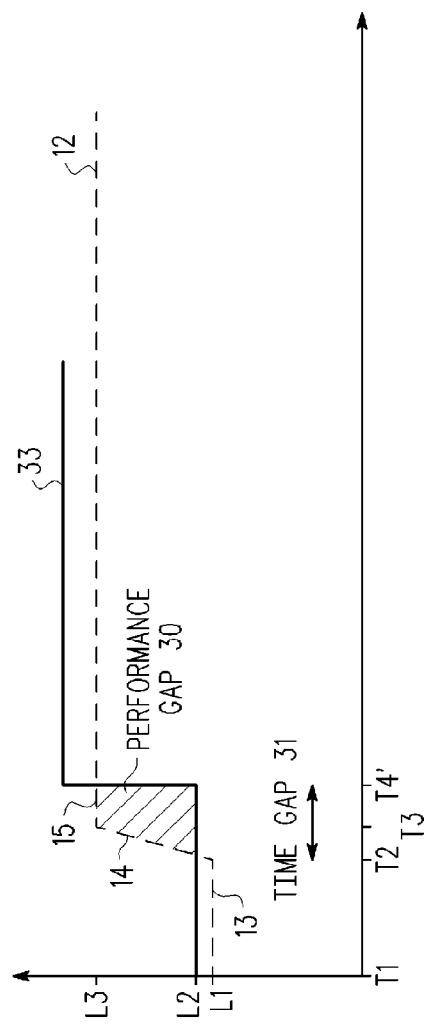

SYSTEM AND METHOD FOR CONTROLLING VOLTAGE LEVEL AND CLOCK FREQUENCY SUPPLIED TO A SYSTEM

FIELD OF THE INVENTION

The present invention relates to methods for controlling voltage level and clock frequency supplied to a system and for a system having voltage and frequency scaling capabilities.

BACKGROUND OF THE INVENTION

High power consumption can lead to high heat dissipation as well as to short battery life. Modern systems are required to operate for relatively long periods before being recharged.

Various techniques were developed in order to reduce the power consumption of modern systems, some being described in the following U.S. patents and patent applications, all being incorporated herein by reference: U.S. Pat. No. 6,115,823 of Velasco et al., titled "System and method for task performance based dynamic distributed power management in a computer system and design method therefore"; U.S. Pat. No. 6,807,227 of Chein, titled "Method of reconfiguration of radio parameters for power aware and adaptive communications"; U.S. patent application publication number 2004/0225901 of Bear et al., titled "Method and system for auxiliary processing of information for a computing system"; U.S. patent application publication number 2003/0061526 of Hashimoto, titled "Computer system and power saving control method therefore"; U.S. Pat. No. 6,901,521 of Chauvel et al., U.S. Pat. No. 5,712,826 of Wong et al., titled "Apparatus and method for embedding dynamic state machines in a static environment"; U.S. Pat. No. 6,584,571 of Fung, titled "system and method of computer operating mode clock control for power consumption reduction", U.S. Pat. No. 6,079,025 of Fung titled "system and method of computer operating mode control for power consumption reduction", and U.S. patent application publication number 2002/0042887 of Chauvel et al., titled "Dynamic hardware configuration for energy management systems using task attributes".

A very popular power reduction technique is known as dynamic voltage scaling (DVS) or alternatively is known as dynamic voltage and frequency scaling (DVFS) and includes altering the voltage that is supplied to an integrated circuit as well as altering the frequency of a clock signal that is provided to the integrated circuit in response to the load of the integrated circuit. Higher voltage levels are associated with higher operating frequencies and higher computational load but are also associated with higher energy consumption.

There is a need to provide an efficient manner to decrease and increase voltage level and clock signal frequency provided to a system.

SUMMARY OF THE PRESENT INVENTION

A method for controlling voltage level and clock frequency supplied to a system and a system having voltage and frequency scaling capabilities as described in the accompanying claims.

BRIEF DESCRIPTION OF THE DRAWINGS

The present invention will be understood and appreciated more fully from the following detailed description taken in conjunction with the drawings in which:

FIG. 1 illustrates a time/performance gap;
FIG. 2 illustrates another time/performance gap.

DETAILED DESCRIPTION OF PREFERRED EMBODIMENTS

Figure 3:
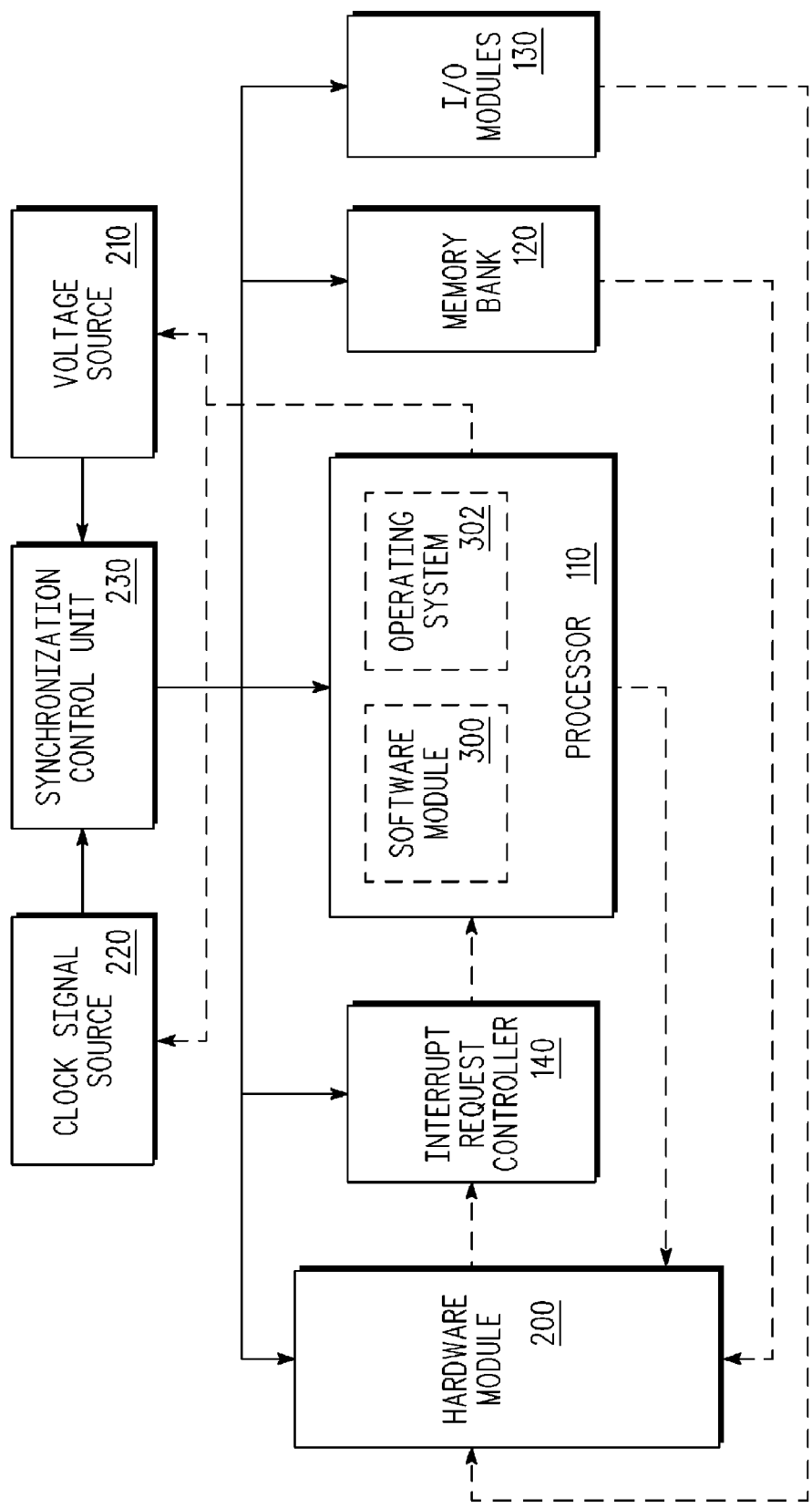
FIG. 3 is a schematic illustration of a system according to an embodiment of the invention.

The invention provides a method and system that dynamically alters the control parameters of its voltage and clock frequency management scheme. This dynamic alteration can be responsive to various system state indications as well as various parameters such as the application that are being executed, expected power saving targets and expected penalties resulting from performance gaps.

The invention provides a method and system that alters the control parameters of the voltage and clock frequency management scheme (also referred to as "management scheme") in response to an expected impact of a performance gap.

The performance gap occurs when the actual performance of the system lags after the required performance, due to lower than required voltage and/or clock frequency.

According to an embodiment of the invention the voltage and clock frequency management scheme receives a first feedback that provides an indication about the load of the system and a second feedback that can indicate the penalty resulting from a performance gap.

The impact of the performance gap can be responsive to various parameters such as: a tolerated error rate of the system (or of a certain application or program), to an actual error rate, quality constraints, the level of supplied voltage and to the frequency of the clock signal, the speed of voltage and clock signal increment, and the like.

For example, assuming that the system is a cellular phone (or is a part of a cellular phone), the actual error rate is high and the tolerated error rate is moderate (a medium level quality of service application). In such a scenario the system should perform many error correction sessions, as the actual error rate is above the tolerated error rate. These error correction sessions are associated multiple load increments that can be spread in an unknown pattern over a long time period. Accordingly, in order to support these error corrections sessions the voltage and clock frequency management scheme should allow rapid increment of the supplied voltage level and clock frequency.

Yet for another example, assuming that the system is a cellular phone (or is a part of a cellular phone), the actual error rate is low and the tolerated error rate is high (a low level quality of service application). In such a scenario the system is not expected to perform many error correction sessions, and the voltage and clock frequency management scheme can apply a more aggressive power saving scheme. Thus, a decision to increase the voltage level and the frequency of the supplied clock signal can be made relatively slow.

Conveniently, the control parameters of the voltage and clock frequency management scheme can include: sampling period, length of decision period, amount of voltage/frequency change, weight of previous load samples on current decision, allowed load estimate thresholds, amount of allowed deviations from the allowed load estimate thresholds, and the like.

Conveniently, the invention applies a first policy for increasing the voltage level and clock frequency and a second policy for decreasing the voltage level and clock frequency. The first and second policies differ from each other and are dynamically altered in response to an expected impact of a voltage and frequency increment gap.

The inventors found up that dynamic alterations of the control parameters is very useful in complex systems that are capable of executing different applications, especially in a varying environment. In these cases it can be very difficult to know in advance which frequency and voltage level to apply.

The following description related to a system that includes a single frequency region (domain). It is noted that this can be applied to a system that includes multiple frequency regions. Typically, multiple frequency regions require separate control for each frequency region.

The following description refers to a hybrid apparatus that includes a hardware model adapted to execute certain tasks as well as a software module adapted to execute other tasks. According to other embodiments of the invention the control of voltage/frequency supplied to a system can be executed by pure software modules, by only hardware modules or by hybrid apparatuses in which the partition between hardware and software executed tasks differs from the mentioned below partition. Furthermore, according to other embodiments of the invention the apparatus executing the voltage/frequency control schemes may apply different decision based processes.

FIG. 1 illustrates a performance gap 10. Dashed curve 12 illustrates the required computational power (for example in Million instructions executed per second MIPS) that is required for performing a first task and then a second task. The execution of the second task requires more computational resources. Curve 12 includes a horizontal portion 13 (between T1 and T2), an ascending portion 14 (between T2 and T3) and another horizontal portion 15 (after T3). The additional horizontal portion 15 is higher than horizontal portion 13, indicating that the level of computational load should be increased (from L1 to L3) during the execution of the second task.

Consecutive curve 18 illustrates the actual computational power of the system, as driven from the voltage and clock signal provided to the system. Between T1 and T2 the system can operate at a certain load level L2 that is slightly greater than L1 but is smaller than L3. The change of the required computational load occurs at T3, but the necessary voltage and clock signal change occurs after a time gap 11 that ends at T4. The performance gap 10 is responsive to the length of time gap 11 (between T3 and T4) and to the difference between L2 and L3. The time gap is also referred to as voltage and clock signal increment decision period.

FIG. 2 illustrates another performance gap 30. Dashed curve 12 illustrates the required computational power that is required for performing a first task and then a second task.

Consecutive curve 33 illustrates the actual load of the system, as driven from the voltage and clock signal provided to the system. Between T1 and T4' the system can operate at a certain load level L2 that is slightly greater than L1 but is smaller than L3. The change of required computational load occurs at T3, but the necessary voltage and clock signal change occurs after a time gap 31 that ends at T4'. The performance gap 30 is responsive to the length of the time gap (between T3 and T4') and to the difference between L2 and L3.

Time gap 11 is much longer than time gap 31, as the management scheme that is applied to produce curve 33 responds much quicker to load changes then the management scheme that is applied to produce curve 33, and the performance gap 10 is expected to be much larger than performance gap 30.

FIG. 1 illustrates a management scheme that is power saving oriented (more aggressive) while FIG. 2 illustrates a management scheme that is more performance oriented (less aggressive).

The clock frequency and voltage scaling can be managed by software modules, by hardware modules or by a combination of both. One exemplary combination of hardware and software modules is illustrates below.

FIG. 3 is a schematic illustration of a system 100 that includes multiple components such as processor 110, memory bank 120, I/O modules 130, interrupt request controller 140, clock signal source 220, voltage source 210, synchronization control unit 230. System 100 also includes a hardware module 200. Conveniently, processor 110 executes a software module 300 that with the hardware module 200 forms apparatus 232.

It is noted that system 100 can have various configurations and that the components illustrated in FIG. 3 represent only a single exemplary configuration of system 100. Typically system 100 is includes within a mobile system such as a cellular phone.

The hardware module 200 is adapted to receive one or more activity related signals representative of an activity of at least one component of the system 100 and in response determine whether to alter the voltage/frequency provided to the components of system 100. Such signals may include, for example, memory access signals (read/write), cache hit/miss signals, bus related signals, processor IDLE/BUSY signal, various processor instructions, interrupt requests, I/O access, and the like.

In addition, apparatus 232 can be further adapted to receive at least one additional indication of an error rate associated with an application being executed by at least one component of the system. In response, the apparatus 232 (for example, hardware module 200) can determine at least one control parameter of a voltage and clock frequency management scheme applied by system 100. That additional indication can be provided by processor 110 or by another system. For example, processor 110 can provide apparatus 232 an indication about a target bit error ratio and of an actual signal to noise ratio (SNR). The apparatus 232 can then alter one or more control parameters in order to affect an expected performance gap to these SNR and BER.

Apparatus 232 is capable of determining the supply voltage and clock frequency supplied to system 100 (said characteristic pair is referred to as voltage/frequency) under various timing constraints that include, for example: the decision period of apparatus 232, voltage supply and clock signal supply stabilization period, and system's 100 and especially processor's 110 load change rate.

When the load of system 100 decreases a significant decrement of the voltage/frequency can amount in large power consumption reduction. Nevertheless, the reduction of voltage/frequency shall take into account the next (lower) voltage/frequency to supply to system 100.

When the load of system 100 increases, the voltage/frequency must be increased relatively fast in order to prevent performance penalties that are especially critical when the system 100 executes a real time program such as a video processing program.

In both cases the apparatus 232 must track the load of system 100 in a relatively fast manner but without introducing too many voltage/frequency changes.

Apparatus 232 can determine which control parameters to use according to the expected performance gap and to a tolerated gap. As well, In any case the control parameters can be asymmetrically set to allow different increment and decrement of voltage and clock signal. For example, if a more aggressive power management scheme is required then apparatus will raise voltage and clock frequency more slowly than it decreases the voltage and clock signal.

The control parameters that can be altered to provide different voltage and clock signal management schemes can include, for example, average load related thresholds Nup and Ndown, Lp and Ldown.

For example, the control parameters can be set in response to a relationship between an actual quality of a wireless channel (usually measured by the signal to noise ratio of the channel) and a required error correction performance of a radio receiver. Data transmitted over a wireless channel is typically protected by error correction codes. One of the most commonly used error correction schemes is known as turbo code. It is a part of various third generation cellular standards, such as wide band Code Division Multiplex (W-CDMA) and CDMA2000. The error correction performance of the turbo code measured either by Bit Error Ratio (BER) or Block Error Ratio (BLER). This performance depends upon the number of turbo decoder iterations. At a given signal to noise ratio (SNR) level lower VER/BLER can be achieved by applying more iterations, and vice verse.

The turbo decoding operation is usually subject to timing constraints and should be completed within a limited period of time. Turbo decoding is a relatively intense, power consuming operation. Thus, the turbo decoder needs to receive, during the turbo decoding period, a certain voltage level and a predefined clock frequency level.

The control parameters of the voltage and clock frequency management actually determine the length of the decoding period, the amount of turbo decoding iterations and the achieved BER and BLER. The turbo decoding process should be stopped according to predefined time constraints. The values of the control parameters affect the start time of the turbo decoding period thus affect the length of the turbo decoding period. Aggressive power saving settings may cause a late provisioning of the appropriate voltage level and clock frequency thus leaving less clock cycles (less turbo decoding iterations) for turbo decoding. Less aggressive power saving settings allow longer turbo decoding periods at higher frequencies thus enable more turbo decoding iterations.

For example, assuming that the receiver includes a wireless channel quality estimator (such as a SNR monitor), a turbo decoder and a BER/BELR monitor (which is usually a part of the turbo decoder itself), then the aggressive control parameters should be set if the actual SNR and the allowed BER/BELR require less iterations of the turbo decoder. On the other hand, if the actual SNR and the allowed BER/BELR require more iterations of the turbo decoder then the control parameters should be less aggressive.

Figure 4:
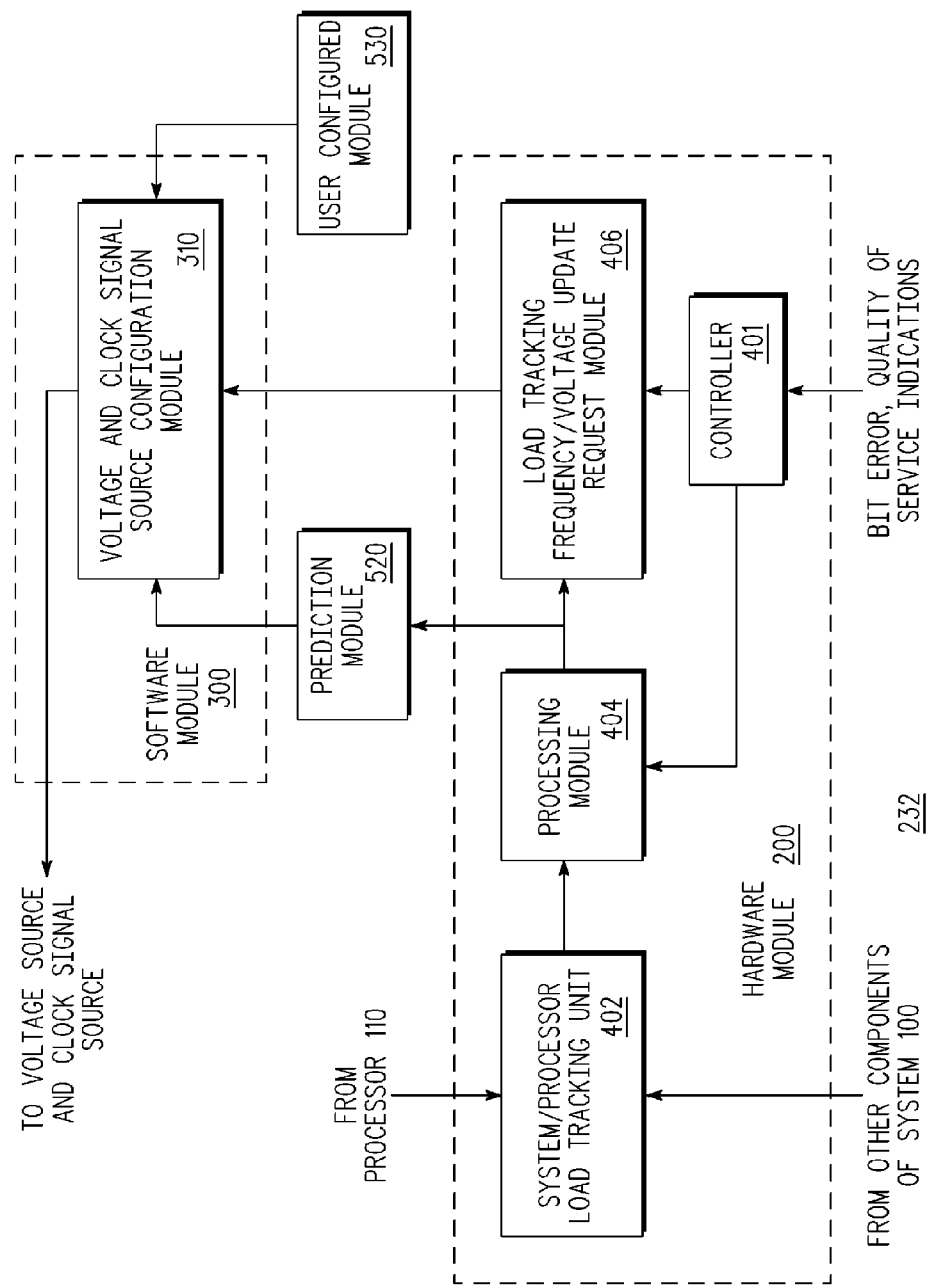
FIG. 4 illustrates an apparatus, according to an embodiment of the invention.

FIG. 4 illustrates apparatus 232, according to an embodiment of the invention.

Conveniently, the various tasks associated with controlling and providing voltage and clock signals to system 100 were divided between the hardware module 200 and the software module 300 of apparatus 232. The hardware module 200 receives one or usually multiple activity related signals, applies a load tracking algorithm such as but not limited to the exponential moving average (EMA) algorithm and determine when to alter the voltage/frequency supplied to system 100.

The software module 300 configures the voltage source 210 and the clock signal source 220.

Apparatus 232 includes a controller 401 that is adapted to receive at least one load indication of at least one component of the system and to selectively alter at least one control parameter of a voltage and clock frequency management scheme. Apparatus 232 then can apply the voltage and clock frequency management scheme.

According to an embodiment of the invention controller 410 can receive at least one error indication signal or Quality of Service indication signals, or a combination of both.

Controller 401 can alter various control parameters by sending control signals to processing module 404 and to load tracking frequency/voltage update request module 406.

Optionally, the apparatus 232 includes a prediction module 520 that predicts how to alter the voltage/frequency in response to previous exponential moving average load estimates. The hardware module 200 includes programmable components thus allowing alterations of the decision process.

The control of the voltage source 210 and clock signal source 220 is relatively simple and does not load the processor 110. Furthermore, its simplicity allows components having limited processing capabilities, such as DMA modules and simple controllers, to execute the voltage and clock signal source configuration module 310. In addition, various existing processors have the capability of setting voltage and clock frequency, thus utilizing this capability further increases the efficiency of apparatus 232 and system 100 as a whole.

The apparatus 232 samples the activity related signals by the clock signal CLK supplied to the system or by a clock signal having a lower frequency. Said sampling provides a more accurate load level tracking than a system that uses a real time clock that is not influenced by the changes of clock signals provided to the monitored system.

System 100 receives a supply voltage V(t) as well as a clock signal CLK of a certain frequency F(t) from a synchronization control unit 230 that synchronizes the levels of V(t) and F(t) such as to prevent, for example, a case in which the supplied voltage V(t) does not allow the system 100 to operate at a the frequency F(t) of the clock signal. The synchronization control unit 230 is connected to a clock signal source 220 for receiving the clock signal and is also connected to a voltage source 210 for receiving the supply voltage. Conveniently, the clock signal source 220 include two phase locked loops, whereas while one is supplying a current clock signal of a current frequency the other can be tuned to supply the next clock signal having a next frequency. The voltage source can also include two voltage sources but this is not necessarily so. It is noted that a single PLL can also be used.

Apparatus 232 includes hardware module 200 that includes controller 401, a system/processor load tracking unit 402, a processing module 404 and a load tracking frequency/voltage update request module 406. The software module 300 includes a voltage and clock signal source configuration module 310. FIG. 4 also illustrates two optional modules such as prediction module 520 and user configures module 530, each can be a hardware module, a software module or a combination of both hardware and software.

The voltage and clock signal source configuration module 310 is capable of configuring the clock signal source 220 as well as the voltage source 210 by various prior art methods, such as writing control values to registers accessed by these sources, or others.

The voltage and clock signal source configuration module 310 is capable of receiving a requests to alter the voltage/frequency from load tracking frequency/voltage update request module 406 and to convert the request to a format that can be understood by and accessible to the clock signal source 220 as well as the voltage source 210.

Conveniently, the voltage and clock signal source configuration module 310 receives also a request to alter the voltage/frequency from a prediction module 520. According to another embodiment of the invention the voltage and clock signal source configuration module 310 is also adapted to receive requests from a user-configured module 530.

When requests can be provided to the voltage and clock signal source configuration module 310 from more that a single module it may apply various decision processes to decide how to alter the voltage/frequency. Each request can be assigned with a certain priority and/or weight and any combination of at least one of the requests can be applied. For example, a request of the prediction module 520 can override a request of the load tracking frequency/voltage update request module 406, and a request from the user-configured module 530 can override both.

System/processor load tracking unit 402 received multiple activity related signal and is capable of assigning a predefined weight to each signal. Conveniently, the system/processor load tracking unit 402 tracks the activity of the processor 100 by monitoring at least one signal such as an IDLE signal and also is also capable of tracking the activity of other components of system.

The a system/processor load tracking module 402 provides an indication of the activities of various components to a processing module 404 that outputs a load indication and an exponential moving average load estimate to the load tracking frequency/voltage update request module 406 and also provides the exponential moving average load estimate to the prediction module 520.

Figure 5:
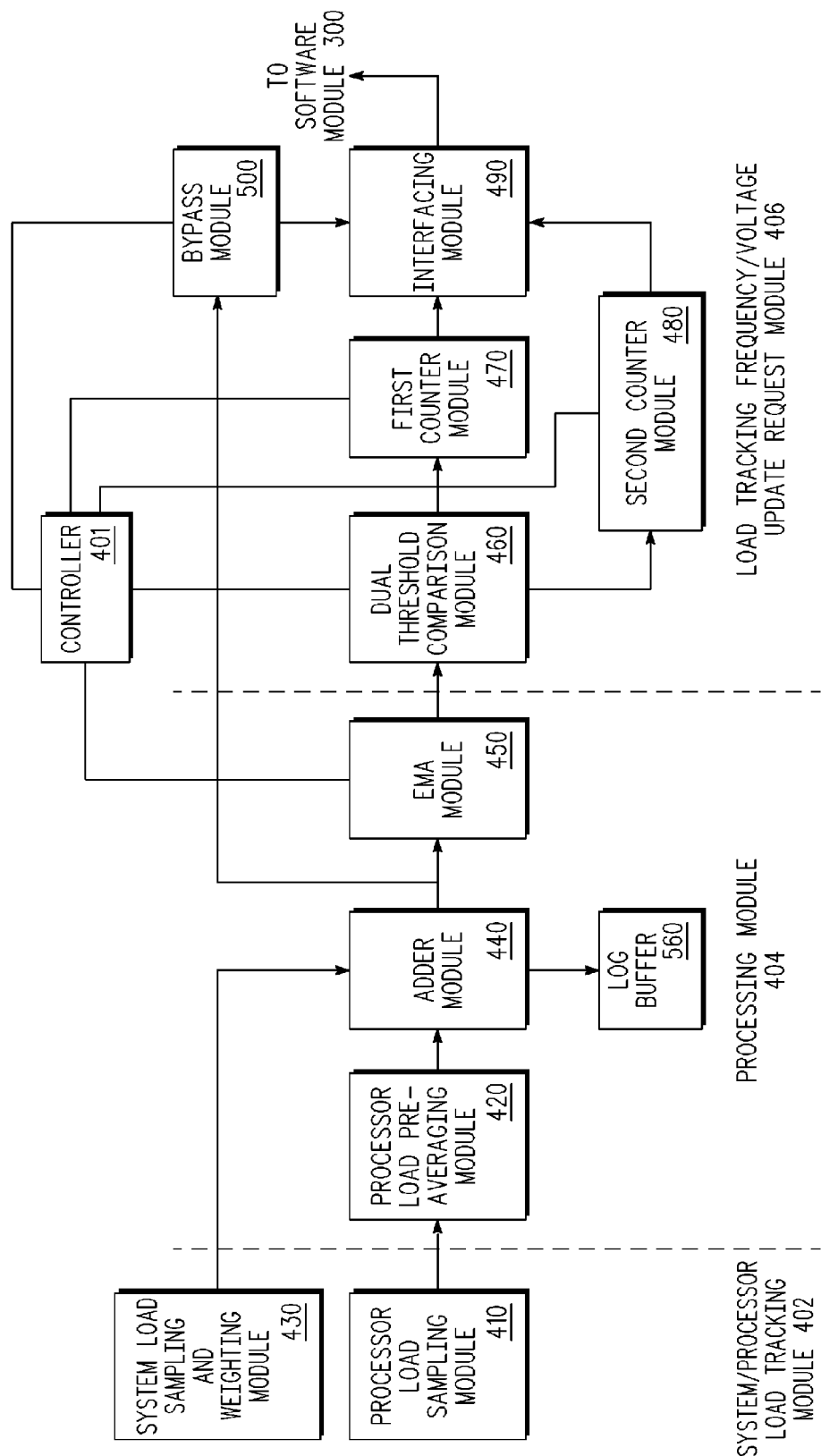
FIG. 5 is a schematic diagram of various modules of an apparatus, according to an embodiment of the invention.

FIG. 5 is a schematic diagram of various modules 401-406 of the apparatus 232, according to an embodiment of the invention.

System/processor load tracking module 402 includes modules 410 and 430. Processor load sampling module 410 samples the IDLE or NON-IDLE (BUSY) signal of processor 110. The IDLE or NON-IDLE (BUSY) signal is sampled by CLK and creates IDLE' sampled signal. Thus IDLE' sampled signal is provided to a processor load pre-averaging module 420 that belongs to processing module 404. The processor load pre-averaging module 420 calculates a ratio R between the amounts of clock signals (CLK) during a certain averaging period and between the amount of sampled signal IDLE' provided by processor load sampling module 410 during that certain averaging period. The length of the averaging period is programmable. Conveniently, either module 410 or module 420 can multiple either IDLE' or R by a programmable weight W_IDLE. Conveniently, the averaging periods do not overlap, but this is not necessarily so.

Conveniently, processor load pre-averaging module 420 also divides CLK to generate a slower clock signal CLK_3 that is provided to various modules such as modules 430 and 440-490.

System load sampling and weighting module 430 receives multiple activity related signals from other components of system 100, although it can also receive one or more signals (other than IDLE) from processor 110. The system load sampling and weighting module 430 samples the received signals by CLK_3 and multiplies each sampled activity related signal by a corresponding programmable weight to provide multiple weighted system activity related signals SL_1-SL_K.

R is also provided to a log buffer 560, and conveniently said log buffer 560 can also receive at least one of the load indication system load indication signals.

Processing module 404 includes modules 420, 440 and 450. Adder module 440 adds R to the multiple weighted system activity related signals SL_1-SL_K to provide a load indication LL(t).

The load indication LL(t) is provided to a bypass module 500 as well to a exponential moving average (EMA) module 450.

The EMA module 450 applies an exponential moving average module algorithm that is responsive to at least one programmable parameter $\alpha$. Basically, EMA performs the following equation: $EMA(t)=\alpha*LL(t)+(1-\alpha)*EMA(t-\Delta t)$, whereas $EMA(t)$ is an exponential moving average load estimate, $\alpha=1/(W+1)$, W is a positive integer representative of an amount of samples that are taken into account within a programmable window and $EMA(t-\Delta t)$ is a result of the previous iteration of an EMA calculation. Typically, $\Delta t$ is responsive to CLK_3 and to an amount of clock cycles required for the calculation of $EMA(t)$.

The inventors used an eight bit $\alpha$, but this is not necessarily so. When $\alpha$ is increased the current value of LL(t) is more dominant thus rapid changes of LL(t) can be tracked. When $\alpha$ is decreased previous samples are more relevant and a more stable tracking process is achieved.

Load tracking frequency/voltage update request module 406 includes modules 460-480. Dual threshold comparison module 460 receives exponential moving average load estimate EMA(t) and compares it in parallel to a upper average load threshold Lup and to a lower average load threshold Ldown.

Each time EMA(t) exceeds Lup the dual threshold comparison module 460 generates a EMA_higher_than_Lup signal. The EMA_higher_than_Lup signal is sent to a first counter module 470 that counts the amount of consecutive EMA_higher_than_Lup signals. The first counter module 470 generates a request to increase the voltage/frequency (Req_up(t)) if more than a programmable amount (N_up) of consequent EMA_higher_than_Lup signals were received.

Each time EMA(t) is below Ldown the dual threshold comparison module 460 generates a EMA_lower_than_Ldown signal. The EMA_lower_than_Ldown signal is sent to a second counter module 480 that counts the amount of consecutive EMA_lower_than_Ldown signals. The second counter module 480 generates a request to decrease the voltage/frequency (Req_down(t)) if more than a programmable amount (N_down) of consequent EMA_lower_than_Ldown signals were received.

According to an embodiment of the invention each policy is tailored to provide optimal performances, by setting appropriate control parameters such as $\alpha$, $\Delta t$ and thresholds N_up, N_down, Lup and Ldown.

Controller 401 can alter these various control parameters by sending control signals to EMA module 450 (altering $\alpha$ and/or $\Delta t$), to dual threshold comparison module 460 (altering Lup and Ldown), bypass module 500 (altering bypass_threshold), first module counter 470 (altering Nup) and second counter module 480 (altering Ndown).

For example, more aggressive management scheme can require longer response periods, thus $\alpha$ can be decreased (making previous measurements more important) and/or increasing the sampling period $\Delta t$. These setting can be used when the control parameters are symmetrically or asymmetrically set.

Yet for another example, assuming that an aggressive power management scheme requires to respond more quickly to reduction in the load of the system than Ndown can be lowered, and/or Ldown can be increased.

Yet for another example, assuming that an aggressive power management scheme requires to respond more slowly to an increment in the load of the system than Nup can be increased, and/or Lup can be increased.

Yet according to another embodiment of the invention multiple calculations of EMA(t), such as calculating $EMA_1(t)$ and $EMA_2(t)$, with corresponding $\alpha_1$ and $\alpha_2$ and/or $\Delta t_1$ and $\Delta t_2$ for further differentiating between the increment and decrement of voltage and clock signal frequencies.

Req_up(t) and Req_down(t) signals are provided to interfacing logic 490 that sets various status bits, accessible by software module 300, to reflect a received request to alter voltage/frequency. Interfacing logic can also send a request to interrupt request controller 140 (or directly to processor 110) to initiate an interrupt request that enables processor 110 to execute voltage and clock signal source configuration module 310. The voltage and clock signal source configuration module 310 converts requests to increase or decrease voltage/frequency to commands that control the clock signal source 220 and the voltage source 210 accordingly.

The bypass module 500 receives LL(t) and compares it to a predefined load threshold Bypass_threshold. If said load threshold is exceeded the bypass module 500 can send a request to increase the voltage/frequency to interfacing logic 490, regardless of the output of modules 450-480. The bypass module 500 allows the apparatus 232 to respond quickly to sudden system overload situations.

The prediction module 520 can predict power consumption based upon previously stored load indications, for example the load indications stored at the log buffer 560.

According to other embodiments of the invention the prediction module 520 can response to instructions being executed by processor 100. For example, it may predict the load when processor 110 executes loops, by monitoring various commands, flow changes an/or loop commands fetched by processor 110. The prediction module 520 can include software components, hardware components or a combination of both.

According to an embodiment of the invention the programmable values provided to the apparatus 232 can be responsive to previously provided values and even to the tasks that are executes by system 100 and especially processor 110. For example, when system 100 mainly processes video the system 100 and especially processor 110 can load a first set of programmable values to the apparatus 232, while when executing other tasks, another set of programmable values can be loaded. The programmable values can be also programmed in response to previous voltage/frequency alterations. For example very frequent voltage/frequency alterations can indicate that a slower tracking process is required and vice verse. The programmable values can also be responsive to other parameters such as operating conditions (such as temperature, battery level) of system 100 and the like.

Figure 6:
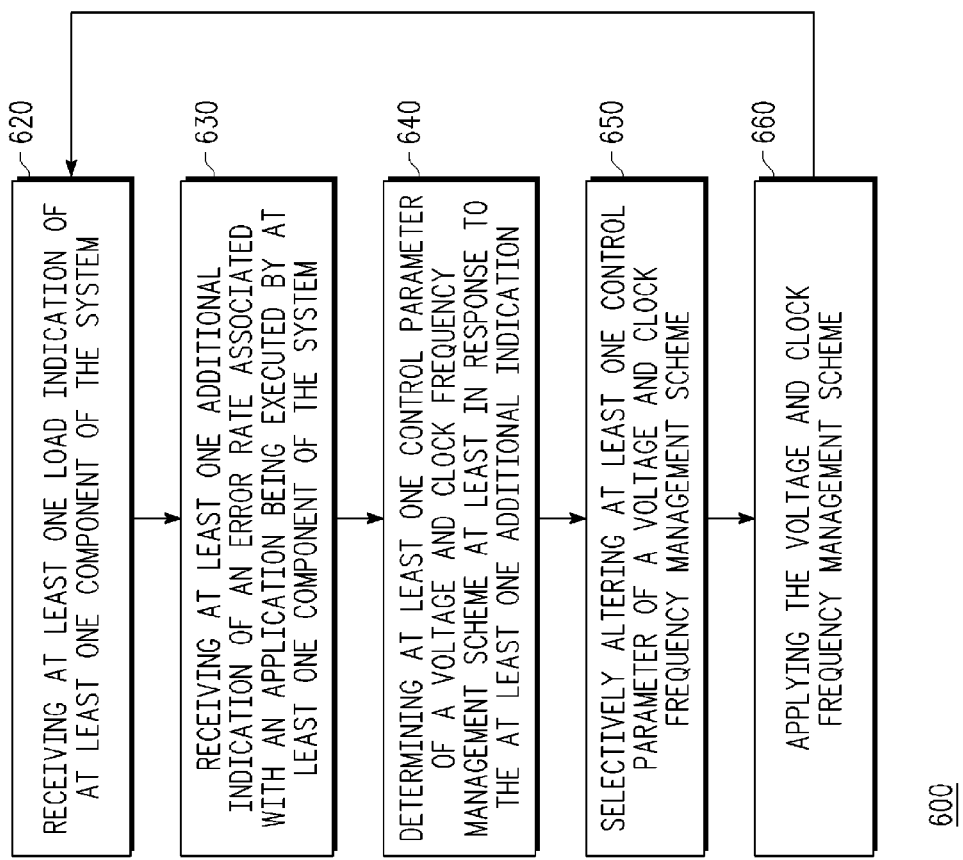
FIG. 6 is a flow chart of a method for controlling voltage level and clock frequency supplied to a system.

FIG. 6 is a flow chart of a method 600 for controlling voltage level and clock frequency supplied to a system, according to an embodiment of the invention.

Method 600 starts by stage 620 of receiving at least one load indication of at least one component of the system.

Stage 620 is followed by stage 630 of receiving at least one additional indication of an error rate associated with an application being executed by at least one component of the system. It is noted that during the execution of method 600 stages 620 and 630 can occur in parallel, and that in many cases additional indications can be received before load indications.

Stage 630 is followed by stage 640 of determining at least one control parameter of a voltage and clock frequency management scheme at least in response to the at least one additional indication. Conveniently, stage 640 includes estimating a performance gap. For example, the performance gap can be responsive to the expected difference in requires computational power, to a time gap that is responsive to the response period of the management scheme, and the like.

Conveniently, the determining is responsive to a relationship between a tolerated error rate of the application and an actual error rate of the application. Assuming, for example, that the system can measure an SNR level and determined what is the actual BER that results from that SNR then the management scheme can be responsive to the difference between the actual BER and a target BER. Assuming that the actual BER is much lower then the target BER, the system can apply a more aggressive management scheme.

Conveniently, the determination is responsive to a power estimate of error correction measures. Thus, if in order to close the performance gap the system has to unnecessarily increase in power consumption this extra power consumption has to be taken into account.

Conveniently, the determination is responsive to quality of communication channel established with the system. This quality can be measured by an SNR measurement.

Conveniently, the determination includes altering a length of a voltage and clock signal increment decision period. For example, altering control parameter $\alpha$ and/or control parameter $\Delta t$ can affect that decision period.

Stage 640 is followed by stage 650 of selectively altering at least one control parameter of a voltage and clock frequency management scheme. The alteration is responsive to a determination of whether to alter one or more control parameter, hence the alteration is selective. Referring to the example set forth in FIG. 4-FIG. 5 controller 401 can determine when to alter one or more control signals.

Conveniently, the altering includes altering at least one threshold (such as Lup, Ldown, Nup or Ndown) associated with an exponential moving average load estimate.

Stage 650 is followed by stage 660 of applying the voltage and clock frequency management scheme. Stage 660 is followed by stage 620.

Stage 660 of applying can occur while other stages of method 600 (such as stages 620-650) are executed. For simplicity of explanation it is illustrated between stage s650 and 620.

Conveniently, the applying includes applying a first policy for increasing the voltage level and clock frequency and applying a second policy for decreasing the voltage level and clock frequency; whereas the first policy differs from the second policy.

Conveniently, this stage is executed by a hardware module, but this is not necessarily so. Conveniently, stage 660 includes configuring a voltage source and a clock signal source in response to the determination. Conveniently, this stage is executed by a software module, but this is not necessarily so.

Conveniently, stage 660 further includes generating a request to increase the voltage level and clock frequency if the load indication exceeds the load threshold. Referring to the example set forth in FIG. 3-FIG. 5, this stage can be implemented by bypass module 500.

Conveniently, method 600 can include one of the following stages: (i) storing load indications, (ii) estimating future load in response to the stored load indications.

According to a further embodiment of the invention method 600 includes providing the clock signal to a first portion of the hardware module and providing another clock signal of a lower frequency to a second portion of the hardware module.

Conveniently, method 600 includes programming at least one programmable parameter of the hardware module.

Figure 7:
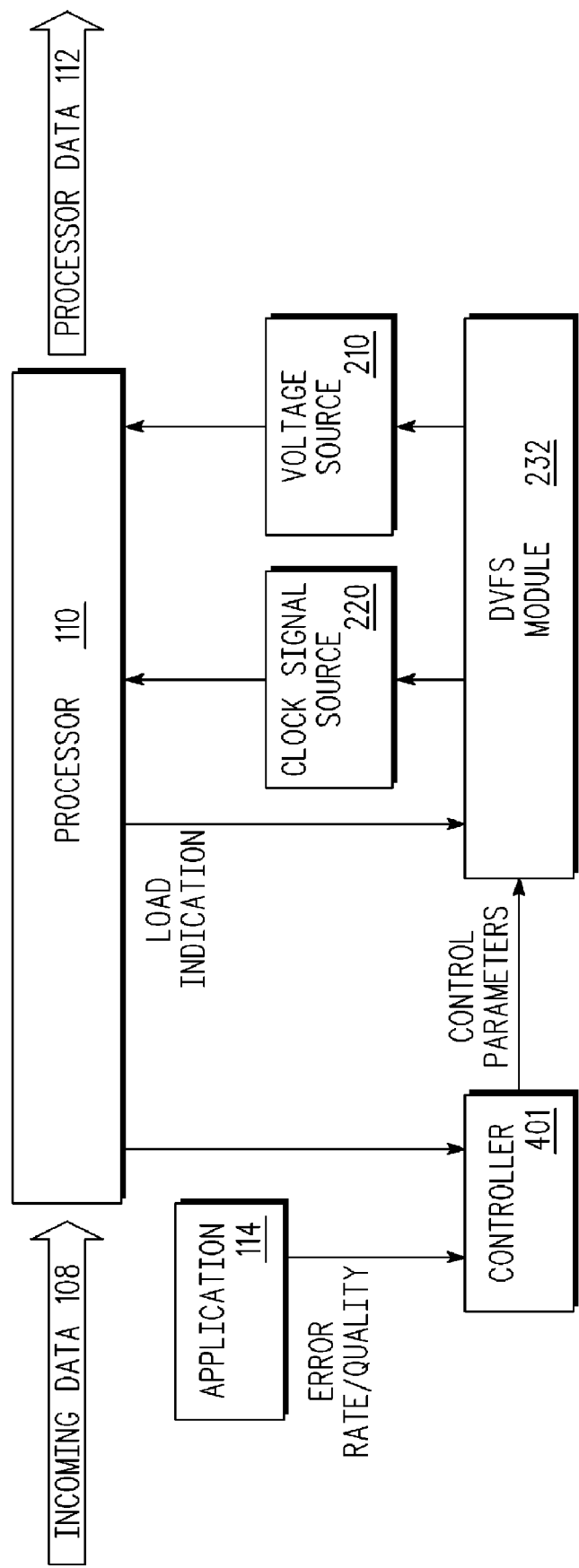
FIG. 7 illustrates a system according to an embodiment of the invention.

FIG. 7 illustrates system 100 according to an embodiment of the invention.

System 100 includes a data processing core such as processor 110. It revives incoming data (arrow 108) and outputs processed data (arrow 112). The processor 110 can be connected to multiple I/O modules, memory units, interrupt controllers and the like.

The processor sends load indication to DVFS module 232 and can send error rate and/or quality indications to controller 401. The controller 401 can receive error rate and/or quality indications from processor 110 or from an application 114 that can be executed by various modules of system 100.

The controller 401 manages the control parameters to DVFS module 232 that controls the clock signal source 220 and the voltage source 210 to provide appropriate clock signals and voltage to processor 110.

Thus, in addition to a first feedback loop that is closed by processor 110, DVFS module 232 and sources 210 and 220, an additional feedback loop is formed. The additional feedback loop includes controller 401, optionally application 114, processor 110 and DVFS module 232.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for controlling voltage level and clock frequency supplied to a system, the method comprises:
    receiving at least one load indication of at least one component of the system;
    repeating the stages of:
        receiving at least one additional indication of an error rate, other than the at least one load indication, associated with an application being executed by at least one component of the system;
        determining at least one control parameter of a voltage and clock frequency management scheme in response to the at least one additional indication, wherein the at least one control parameter includes a load related threshold;
        altering the at least one control parameter of the voltage and clock frequency management scheme; and
        applying the voltage and clock frequency management scheme based on the altered at least one control parameter.

2. The method according to claim 1 wherein the determining comprises altering a weight of previous load samples on current decision.

3. The method according to claim 1, whereas the determining comprises estimating a performance gap.

4. The method according to claim 1, whereas the determining is responsive to a relationship between a tolerated error rate of the application and an actual error rate of the application.

5. The method according to claim 1, whereas the determining is responsive to a power estimate of error correction measures.

6. The method according to claim 1, whereas the determining is responsive to quality of communication channel established with the system.

7. The method according to claim 1, whereas the determining comprises altering a duration of a voltage and clock signal increment decision period.

8. The method according to claim 1, further comprising:
    receiving at least one additional indication of a quality level associated with an application being executed by at least one component of the system; and
    determining the at least one control parameter of the voltage and clock frequency management scheme at least in response to the at least one additional indication.

9. The method according to claim 1, whereas the altering comprises altering at least one thresholds associated with an exponential moving average load estimate.

10. The method according to claim 1 further comprising receiving at least one additional indication of an amount of errors associated with an application being executed by the at least one component of the system; and determining the at least one control parameter of the voltage and clock frequency management scheme in response to the at least one additional indication of the amount of errors.

11. A system that comprises:
    at least one component adapted to execute at least one application,
    a controller adapted to repetitively and alter at least one control parameter of a voltage and clock frequency management scheme, wherein the at least one control parameter includes a load related threshold;
    whereas the system is adapted to repetitively apply the voltage and clock frequency management scheme based on the altered at least one control parameter;
    wherein the system is further adapted to receive at least one indication of an error rate associated with an application being executed by the at least one component of the system and to determine the at least one control parameter of the voltage and clock frequency management scheme at least in response to the at least one indication of the error rate.

12. The system according to claim 11 further adapted to alter wherein the determining comprises altering a weight of previous load samples on current decision.

13. The system according to claim 11, whereas the system is adapted to estimate a performance gap.

14. The system according to claim 11, whereas the system is responsive to a relationship between a tolerated error rate of the application and an actual error rate of the application.

15. The system according to claim 11, whereas the system is responsive to a power estimate of error correction measures.

16. The system according to claim 11, whereas the system is adapted to alter a length of a voltage and clock signal increment decision period.

17. The system according to claim 11, whereas the system is adapted to receive at least one indication of a quality level associated with an application being executed by the at least one component of the system; and determine the at least one control parameter of the voltage and clock frequency management scheme at least in response to the at least one indication of the quality level.

18. The system according to claim 11, whereas the system is adapted to alter at least one threshold associated with an exponential moving average load estimate.

19. The system according to claim 11 further adapted to receive at least one indication of an amount of errors associated with an application being executed by the at least one component of the system and to determine the at least one control parameter of the voltage and clock frequency management scheme at least in response to the at least one indication of the amount of errors.

20. A method for controlling voltage level and clock frequency supplied to a system, the method comprises:
repeating the stages of:
receiving at least one indication of an error rate associated with an application being executed by at least one component of the system;
determining at least one control parameter of a voltage and clock frequency management scheme in response to the at least one indication of the error rate, wherein the at least one control parameter includes a load related threshold;
determining whether the error rate is above or below a target error rate;
in response to determining whether the error rate is above or below the target error rate, if the error rate is below the target error rate, altering the at least one control parameter of the voltage and clock frequency management scheme to apply a more aggressive voltage and clock frequency management scheme as the voltage and clock frequency management scheme;
in response to determining whether the error rate is above or below the target error rate, if the error rate is above the target error rate, altering the at least one control parameter of the voltage and clock frequency management scheme to apply a less aggressive voltage and clock frequency management scheme as the voltage and clock frequency management scheme; and
applying the voltage and clock frequency management scheme based on the altered at least one control parameter.

* * * * *